United States Patent [19]
McSweeney et al.

[11] Patent Number: 6,003,617
[45] Date of Patent: Dec. 21, 1999

[54] INSERT FOR BOARD

[75] Inventors: Larry J. McSweeney, 3460 Co. Rd. 15; Lawrence H. McSweeney, 3788 Co. Rd. 15, both of South Point, Ohio 45680; Ronald D. Mills, Yorba Linda, Calif.

[73] Assignees: Larry J. McSweeney; Lawrence H. McSweeney, both of Southpoint, Ohio

[21] Appl. No.: 09/021,060

[22] Filed: Feb. 9, 1998

[51] Int. Cl.⁶ .................................................. A01B 15/00
[52] U.S. Cl. .................. 172/719; 172/772.5; 172/701.1; 37/460; 37/446
[58] Field of Search ................................ 37/460, 453, 446, 37/903; 172/747, 701.1, 701.3, 719, 772, 772.5

[56] References Cited

U.S. PATENT DOCUMENTS

| | | |
|---|---|---|
| 1,927,818 | 9/1933 | Brodersen ............................ 37/460 X |
| 2,285,039 | 6/1942 | Lowe .................................. 172/719 X |
| 3,202,222 | 8/1965 | Norris ................................ 172/719 X |
| 3,529,677 | 9/1970 | Stephenson . |
| 3,852,711 | 12/1974 | Stepe ................................. 172/719 X |
| 3,934,654 | 1/1976 | Stephenson et al. . |
| 4,086,966 | 5/1978 | Lanz et al. ........................... 37/460 X |
| 4,128,132 | 12/1978 | Moen et al. ......................... 37/460 X |
| 5,224,555 | 7/1993 | Bain et al. ......................... 172/719 X |
| 5,427,186 | 6/1995 | Adrian et al. . |
| 5,471,770 | 12/1995 | Ferreira . |
| 5,611,157 | 3/1997 | Ferreira . |
| 5,778,572 | 7/1998 | Lukavich et al. ........................ 37/460 |
| 5,813,474 | 9/1998 | Manway ............................... 37/460 X |

*Primary Examiner*—Victor Batson
*Attorney, Agent, or Firm*—Christen M. Millard; Kremblas, Foster, Millard & Pollick

[57] ABSTRACT

An insert cooperates with the channel in a material moving board. The insert is adapted to reach at least ¾ of the way from the front edge to the rear edge of the board. The insert is preferably brazed to the channel and is made primarily of tungsten carbide and a cobalt binder.

20 Claims, 6 Drawing Sheets

INSERT FOR BOARD

BACKGROUND OF THE INVENTION

1. Field of the Invention

This invention relates generally to a carbide insert which is brazed into a material-moving board or blade and, more particularly, to a carbide insert which is adapted to extend substantially the full width of the board.

2. Description of the Related Art

It is standard in the industry to put an insert, most commonly made of an alloy of tungsten carbide, in the lower edge of a board or blade in order to strengthen it. An example of such an insert is shown in the patent to Stephenson, U.S. Pat. No. 3,529,677. It is noted that this insert does not extend the full width of the board, but instead is only a portion of the width of the board. While such an insert is useful in somewhat reducing the wear on the board, it is also true that part of the metal or other substance making up the board does tend to deteriorate since the board still is in contact with the ground. Because the board is typically made of a softer material than the insert, it tends to wear away from the insert and the insert then falls out and the board itself must be replaced.

The reference to Stephenson et al., U.S. Pat. No. 3,934,654, takes a step in correcting this problem. It is noted that in this reference, the carbide insert is shaped such that a larger portion of the insert is touching the ground and a much smaller portion of the board touches the ground. Such a system will help to a certain extent in reducing the wear on the board. However, where the board touches the ground there will still be wear and the board will wear away from the insert causing the insert to fall out and requiring replacement of the board.

The patent to Adrian et al., U.S. Pat. No. 5,427,186, shows a different method for reducing wear on a board. However, this insert correlates primarily to wear which would occur on the front edge of a board. The problem of the board wearing away from touching the ground still remains.

A similar problem was addressed in the patents to Ferreira, U.S. Pat. Nos. 5,471,770 and 5,611,157, where a rubberized wear pad is attached to the bottom of a board. The primary purpose in this system is to prevent wear to a road from the use of the board. Of less concern is damage to the board itself. The wear pad will have some effect in keeping the board from deteriorating, however in many applications such a pad will deteriorate rapidly and require frequent replacement. However, such a system is not effective for each application, since in many instances it is desirable that a metal rather than a polyurethane edge be used.

Those skilled in this art have failed to solve the problem of providing an insert structure which adequately protects the material-moving board from rapid wear, is readily adaptable to conventional boards, is itself significantly resistant to wear erosion to provide a sufficient useful life, and which may be more securely attached to the board to resist premature separation from the board.

SUMMARY OF THE INVENTION

The invention is primarily an insert for mounting in a receiving opening, such as a channel, formed longitudinally along the lower edge of a vehicle-mounted, material-moving board, such as a snow plow board. For purposes of this application, "length" is the dimension of the board or blade substantially perpendicular to the direction of movement of the board and "width" is the dimension of the board which is substantially parallel to the direction of movement of the board. The insert includes a neck portion which extends into the channel for securing the insert in the channel and a pavement-contacting portion which extends from the neck portion and which has distally opposite side walls which taper outwardly from the neck portion. The board has a width and the pavement-contacting portion has a width. The width of the pavement-contacting portion should be at least ¾ the width of the board and may extend the full width of the board. The insert should be about 1 inch long; thus several inserts are needed to extend the full length of the board. One edge of the board and the pavement-contacting portion meet at an angle of about 65 degrees. The board has a center line and the insert has a center line, the center line of the board being slightly offset from the center line of the insert. The neck portion has a width which is about half the width of the board.

The insert is made of a mixture of materials. The two primary components are cobalt binder and tungsten carbide. The insert should be about 89% or less of tungsten carbide and about 11% or more of cobalt binder. Some small amounts of additional materials may also be included, but are not likely to affect the strength of the mixture.

The board includes a longitudinally extending channel which cooperates with the insert and thus has a neck portion and a tapered portion. The insert is brazed to the board and is also important that the board and the insert come together at an angle of about 65 degrees.

In describing the preferred embodiment of the invention which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose. For example, the word connected or terms similar thereto are often used. They are not limited to direct connection but include connection through other circuit elements where such connection is recognized as being equivalent by those skilled in the art.

DETAILED DESCRIPTION OF THE DRAWINGS

Figure 1:
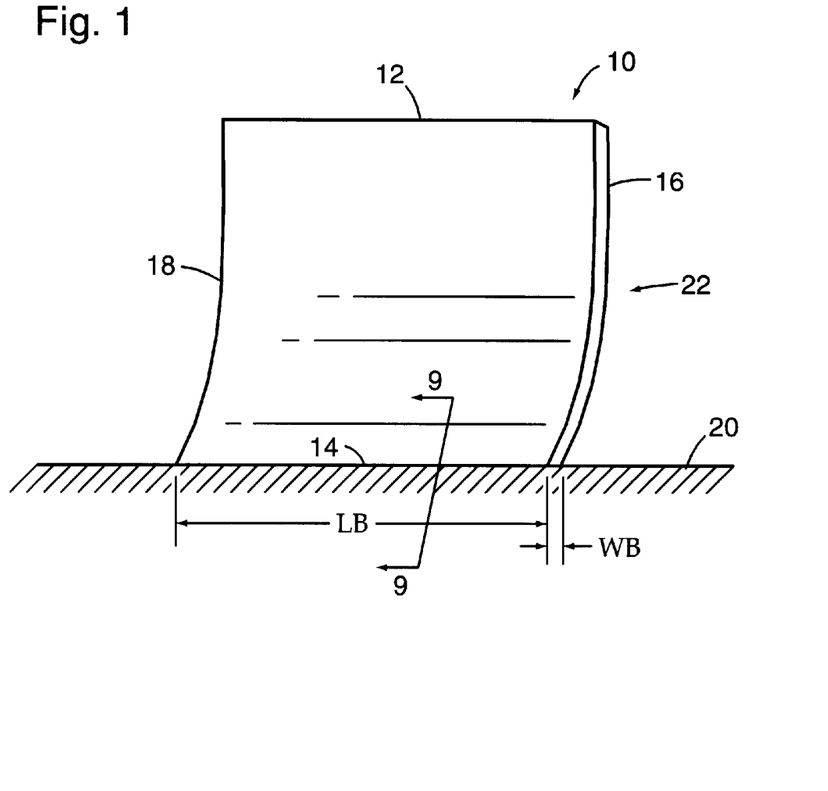
FIG. 1 is a perspective view of a board according to the invention.

Turning first to FIG. 1, there is shown the present invention which relates primarily to an insert for a board 10 having a length LB and a width WB. The board 10 is designed for moving a variety of types of materials. The board 10 may include such things as a snow plow board, a board on the front of a bulldozer, or the like. The generic term board is used in that it encompasses all material-moving boards and the like. The board 10 is typically mounted to a vehicle (not shown), such as a snow plow or bulldozer for powering and moving of the board 10. The board 10 has an upper edge 12, a lower edge 14, and two oppositely extending side edges 16,18 which extend from the upper edge 12 to the lower edge 14. The lower edge 14 comes in contact with the ground 20. The board 10 typically has a bend shown generally as 22 which allows for the easier moving of materials, such as snow, dirt, rocks and the like.

Figure 2:
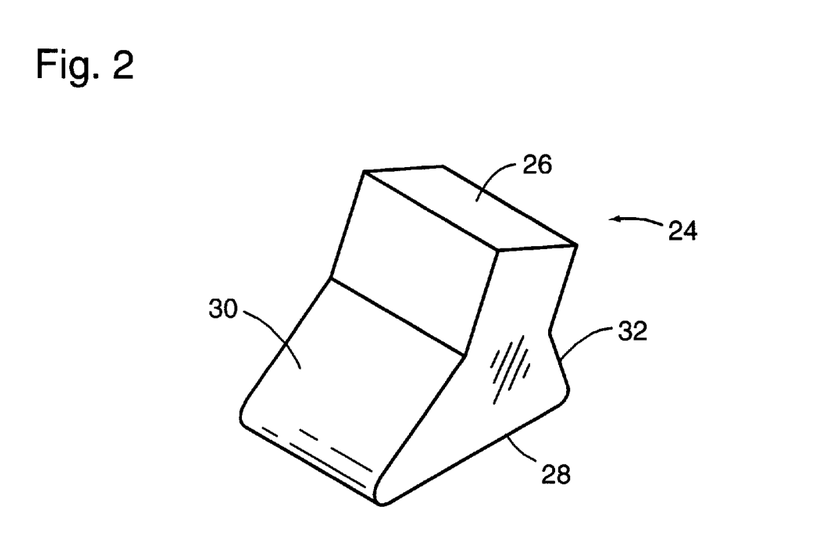
FIG. 2 is a perspective view of an insert according to the invention.

Turning now to FIG. 2, there is shown an insert 24 according to the invention. The insert 24 includes a neck portion 26 and a pavement-contacting portion 28. The pavement-contacting portion 28 includes distally opposite sidewalls 30,32 which taper outwardly from the neck portion 26. The angle at which the sidewall 30 tapers is greater than the angle at which sidewall 32 tapers for reasons which will be described later herein.

Figure 3:
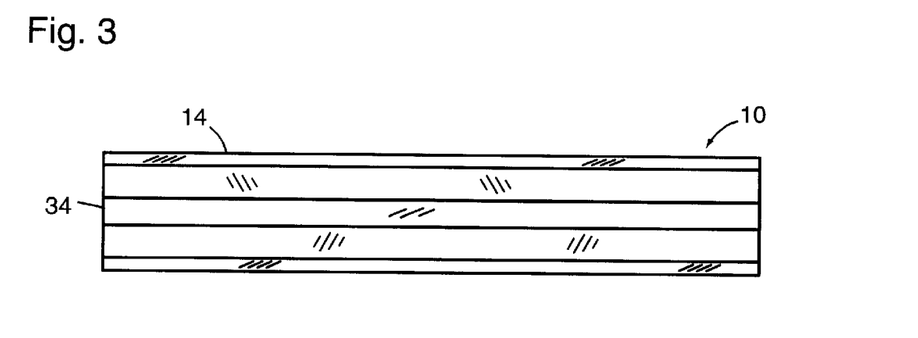
FIG. 3 is a bottom view of a first embodiment of a channel in a board according to the present invention.
Figure 4:
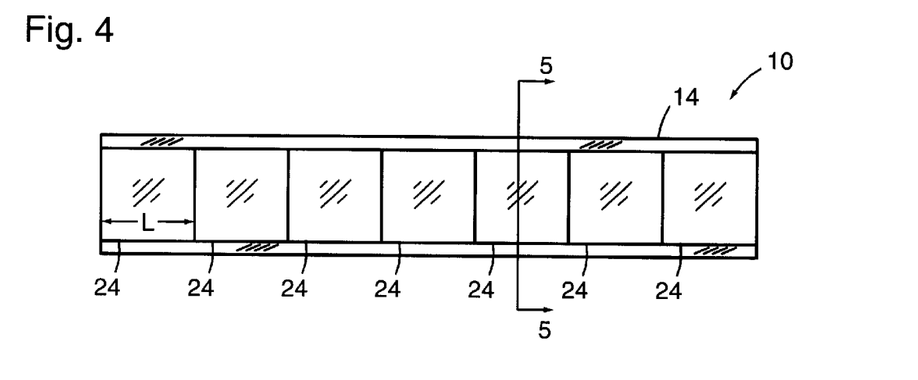
FIG. 4 is a bottom view of a first embodiment of a channel according to the invention with the insert therein.
Figure 5:
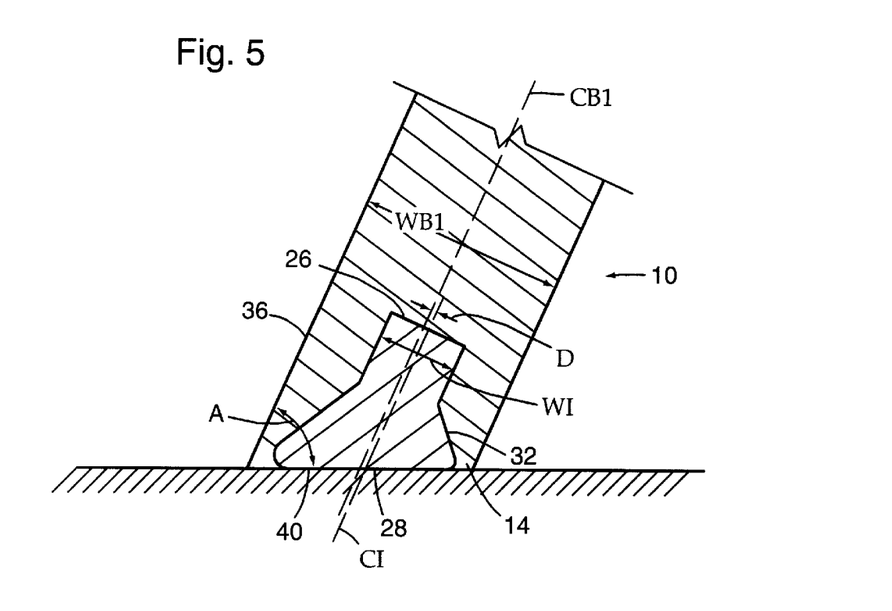
FIG. 5 is a partial sectional view of the first embodiment of the channel and insert according to the invention taken along line 5—5 of FIG. 4.

FIGS. 3–5 illustrate a first embodiment of the board 10 and insert 24 according to the invention. As shown in FIG. 3, a receiving opening, here channel 34, extends longitudinally along the lower edge 14 of the board 10. As shown in FIG. 4, a number of inserts 24 are placed within the channel 34 until the inserts fill up the entire channel 34. Each insert 24 has a length L which is approximately 1 inch. Each insert 24 cannot have a length L much longer than about 1 inch because the insert 24 will then lack stability and the ability to be retained in the channel 34. Turning to FIG. 5, it can be seen that the pavement-contacting portion 28 extends much of the width WB1 of the board 10 of the first embodiment.

The pavement-contacting portion 28 should extend at least ¾ the width WB1 of the first embodiment of the board 10. As a rule, material-moving boards come in two widths. The width WB1 of the first embodiment of the board 10 is approximately ⅞ inch. The width WI of the neck portion 26 of the insert 24 is about half the width WB1 of the first embodiment of the board 10. It is also noted that the center line CB1 of the board 10 is offset slightly from the center line CI of the insert 24. Preferably, the distance D between the center line CB1 of the board 10 and the center line CI of the insert 24 is approximately 0.037 inches. It is also important that the angle A which is formed by the front edge 36 of the board 10 and the bottom 40 of the pavement-contacting portion 28 is preferably about 65 degrees.

Figure 6:
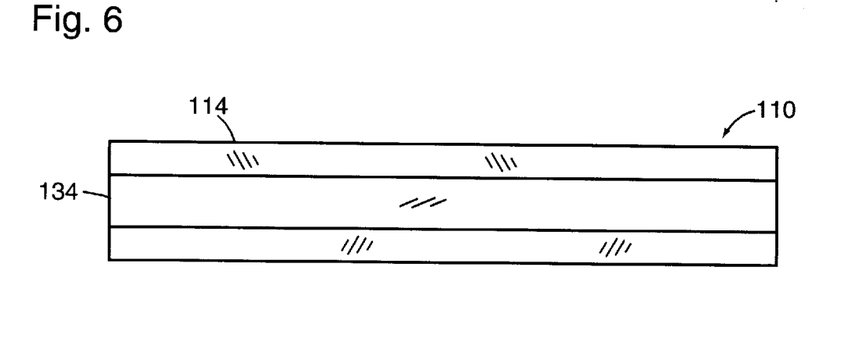
FIG. 6 is a bottom view of a second embodiment of a channel in a board according to the invention.
Figure 7:
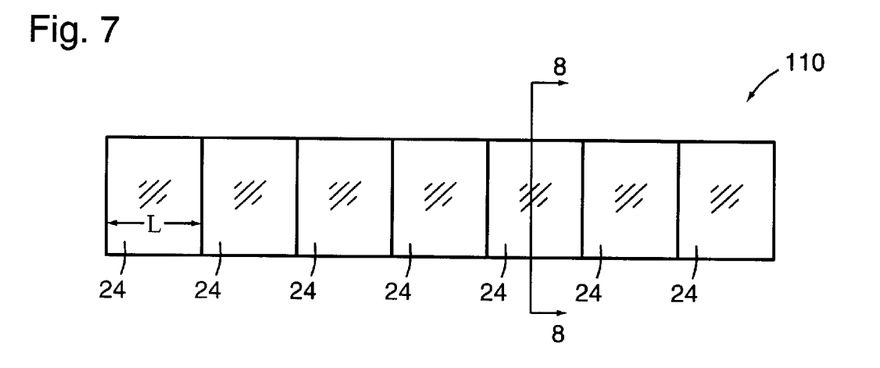
FIG. 7 is a bottom view of a second embodiment of a channel according to the invention with the insert being inserted therein.
Figure 8:
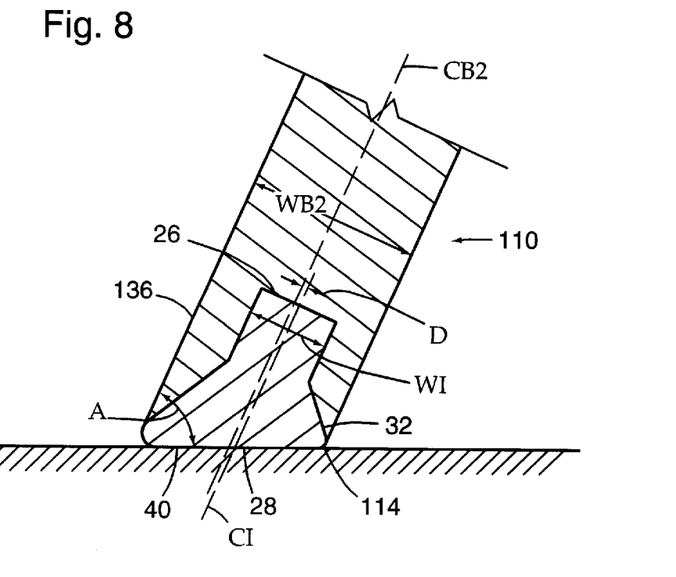
FIG. 8 is a partial sectional view taken along line 8—8 of FIG. 7 according to the second embodiment of the invention.

Turning now to FIGS. 6–8, the second embodiment of the board 110 is shown. FIG. 6 shows the receiving opening or channel 134 in the board 110. FIG. 7 shows the board 110 with inserts 24 already within the channel 134. The insert 24 remains the same regardless of the embodiment of the board 110 as long as the channel 34,134 cooperates properly with the insert 24. The insert 24 has a length L which is approximately 1 inch. Turning now to FIG. 8, there is shown a board 110 which has a width WB2 of about ¾ inch. In this embodiment it is noted that pavement-contacting portion 28 of the insert 24 extends the full width WB2 of the second embodiment of the board 110. Again the board 110 has a center line CB2 which is offset from the center line CI of the insert 24, preferably by about 0.037 inches. The angle A between the front edge 136 of the board 110 and the bottom 40 of the insert 24 remains about 65 degrees.

It will be appreciated and understood by one of ordinary skill in the art that a variety of boards may be used with the present insert. It is important, however, that the insert extend at least ¾ of the way across the board and preferably the full width of the board. However, as long as the channel is cut to cooperate properly with the insert, a variety of boards and inserts may be properly used. As is typical with these types of inserts, the insert is attached by a conventional brazing process to the board.

The insert 24 is preferably made from a composition of tungsten carbide and a cobalt binder. The insert 24 may also include a variety of other materials. Preferably, however, the insert 24 is made entirely of carbide and a binder and some inert ingredients which neither add nor detract from the performance of the insert. Most preferably, the insert 24 is made primarily of tungsten carbide, up to 89% by weight, and a minimum of 11% cobalt binder by weight.

Figure 9:
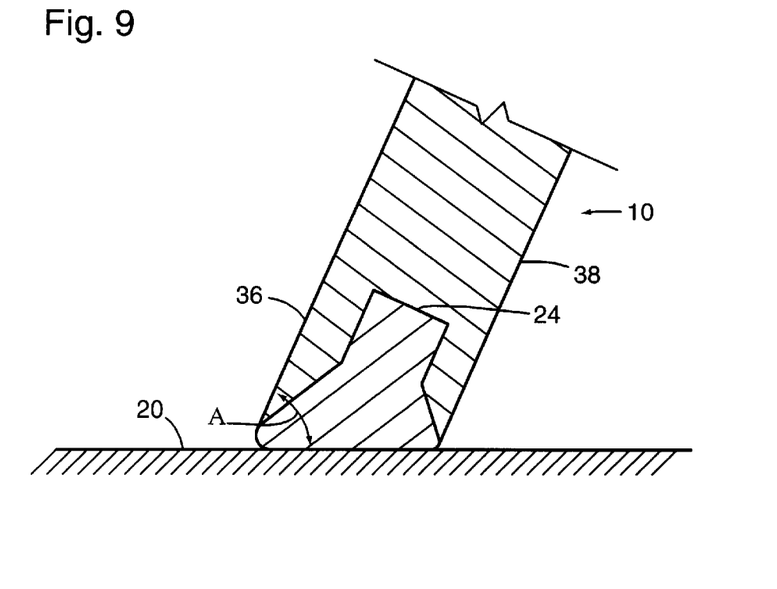
FIG. 9 is a partial sectional view taken along line 9—9 of FIG. 1 accordingly showing the channel and insert on the ground.

As is most clearly shown in FIG. 9, the use of the insert 24 causes increased performance of the board. Because the insert 24 extends substantially all the way to the front edge 36 of the board 10 and the rear edge 38 of the board 10, very little, if any, of the board 10 or the steel of the board 10 come into contact with the ground 20. Since the composition of the insert 24 is harder and stronger than the steel in the board 10, the use of the insert 24 in the board 10 will cause the board 10 to wear down much more slowly than if the board 10 were used alone or with an insert which does not extend substantially all the way from the front edge 36 to the rear edge 38. That the insert 24 extends across much of the board 10 is therefore important. It is then noted that the angle between the front edge 36 and the ground 20 should be approximately 65 degrees which is the optimal angle for collection of materials such as snow, dirt, and the like.

Figure 10:
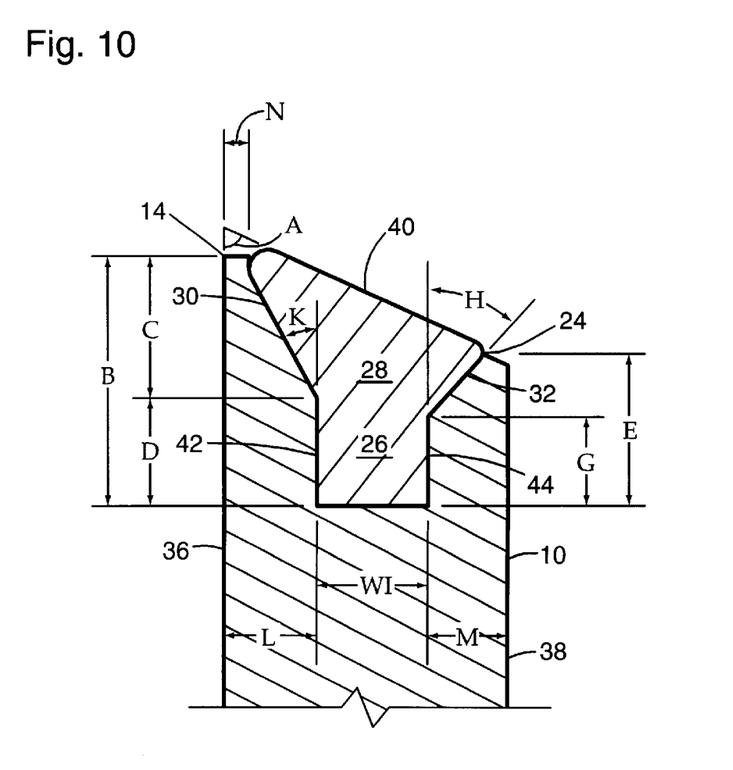
FIG. 10 is a cross-sectional view of a preferred embodiment of the invention.

The most preferred dimensions for the insert 24 are seen in FIG. 10. As shown, the bottom 40 of insert 24 may extend beyond the lower edge 14 of the board 10. The height B of the insert 24 is between about 0.689 inches and about 0.759 inches. The height B includes the height D of the first side 42 of the neck portion 26, which is about 0.3 inches, and the height C of the first side 30 of the pavement-contacting portion 28, which is between about 0.389 inches and about 0.459 inches. Because there must be an angle A which is less than 90 degrees, the height E of the other side of the insert 24 is less than the height B, namely between about 0.430 inches and about 0.435 inches. The height G of the second side 44 of the neck portion 26 is about 0.260 inches. The angle H of the second side 32 of the pavement-contacting portion 28 is about 45 degrees and the angle K of the first side 30 of the pavement-contacting portion 28 is about 28 degrees. The width WI of the neck portion 26 is between about 0.370 inches and about 0.378 inches, about half the width of the ¾ inch or ⅞ inch board 10. Because of the offset of the center lines CB1, CB2, of the board 10,110 and the center line CI, of the insert 24, the insert 24 is not precisely in the center of the board 10. Instead it is offset a distance L from the front side 36 of the board 10 by a distance of between about 0.205 inches and about 0.271 inches, and it is offset a distance M from the back side 38 of the board 10 by a distance of between about 0.168 inches and about 0.234 inches.

For boards with larger widths, dimensions on the upper ends of the above-given ranges are preferred, while for boards with smaller widths, the smaller values of the dimensions are preferred. For the preferred ⅞ inch width board, the insert 24 is offset from the front edge 36 by a distance N about 0.057 inches. These dimensions are provided only by way of example. One of ordinary skill in the art will be easily able to adapt the present invention and its preferred dimensions based upon the teachings herein, while maintaining the inventive concept and these adjustments are intended to fall within the scope of the invention.

Figure 11:
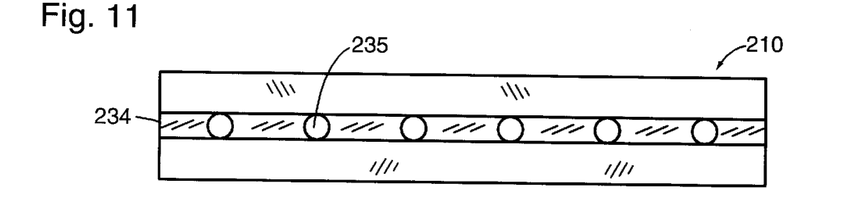
FIG. 11 is a bottom view of a third embodiment of a channel according to the invention.
Figure 12:
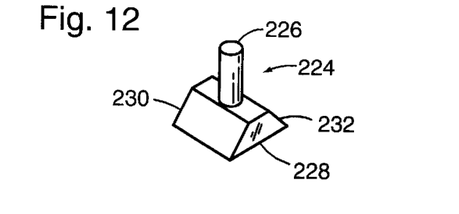
FIG. 12 is a perspective view of a third embodiment of an insert corresponding to the channel of FIG. 11 according to the invention.
Figure 13:
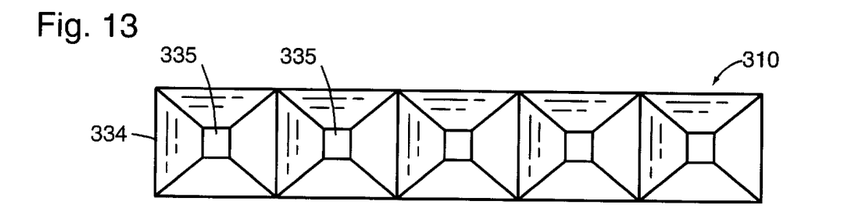
FIG. 13 is bottom view of a fourth embodiment of a channel according to the invention.
Figure 14:
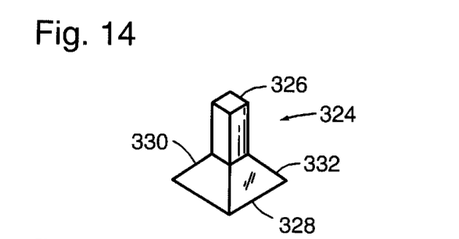
FIG. 14 is a perspective view of a fourth embodiment of an insert corresponding to the channel of FIG. 13 according to the invention.

A variety of modifications can be made by one of ordinary skill in the art without undue experimentation. As seen in FIGS. 11 and 12, the receiving opening or channel 234 in the board 210 may also include a variety of receivers 235. This channel 234 and receiver 235 combination is considered to come within the scope of the term "receiving opening" as used in this application, for ease of language. These receivers 235 receive the neck portion 226 of the corresponding insert 224. This insert 224 includes the same pavement contacting portion 228 with opposing side walls 230 and 232. As seen in FIGS. 13 and 14, the receiving opening or channel 334 is a series of receivers 335. This series of receivers 335 is also considered to come within the scope of the term "receiving opening" in this application, for ease of language. These receivers 335 correspond with and receive the inserts 324. These inserts have a neck portion 326 and a pavement contacting portion 328 which includes four side walls, only two of which are shown as 330 and 332. The other two side walls (not shown) are opposite the two shown.

Figure 15:
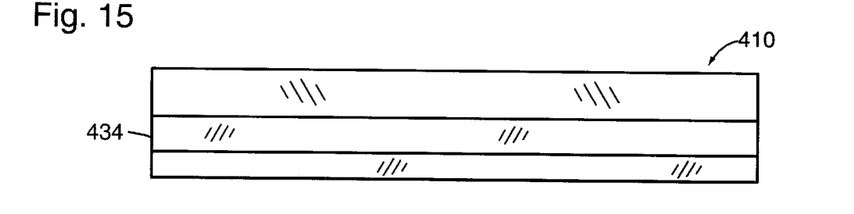
FIG. 15 is bottom view of a fifth embodiment of a channel according to the invention.
Figure 16:
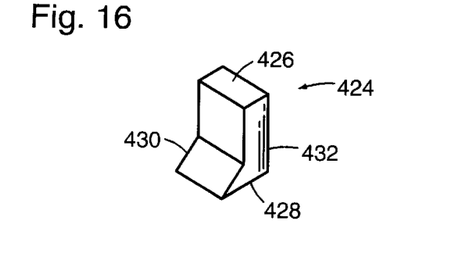
FIG. 16 is a perspective view of a fifth embodiment of an insert corresponding to the channel of FIG. 15 according to the invention.
Figure 17:
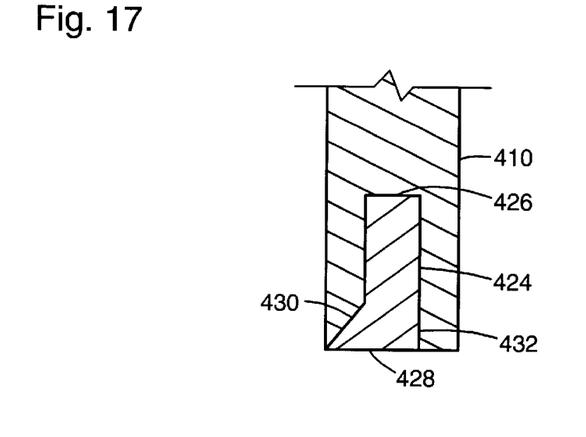
FIG. 17 is a cross sectional view of the fifth embodiment of a channel and insert of FIGS. 15 and 16 according to the invention.

Turning now to FIGS. 15–17, a less preferred embodiment is shown. In this embodiment, there is a channel 434 in a board 410. However, the insert 424 differs from the inserts previously described. This insert 424 includes a neck portion 426 and a pavement contacting portion 428. The pavement contacting portion 428 includes two distally opposite side walls 430 and 432. However, only side wall 430 tapers outwardly from the neck portion 426. This configuration may not extend quite as far across the width of the board 410 and is therefore less preferred.

Figure 18:
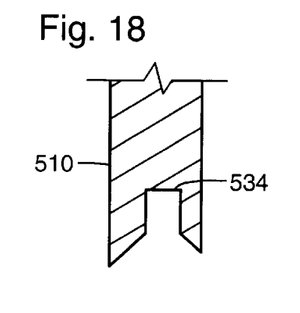
FIG. 18 is a cross sectional view of a sixth embodiment of a channel according to the invention.
Figure 19:
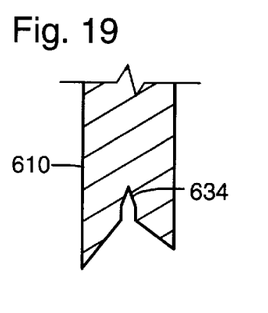
FIG. 19 is a cross-sectional view of a seventh embodiment of a channel according to the invention.
Figure 20:
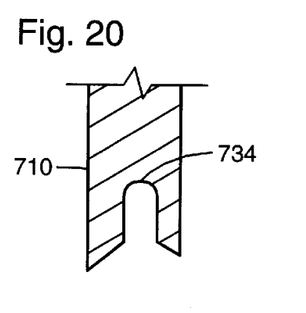
FIG. 20 is a cross-sectional view of a eighth embodiment of a channel according to the invention.

FIGS. 18–20 show other possible channel shapes. The channels as shown in the majority of the previous Figs. are as shown in FIG. 18 as channel 534 in board 510. However, the cross-sectional shapes of channel 634 in board 610 and channel 734 in board 710 are also possible. The latter shapes are less preferred as they are more difficult and expensive to make.

Figure 21:
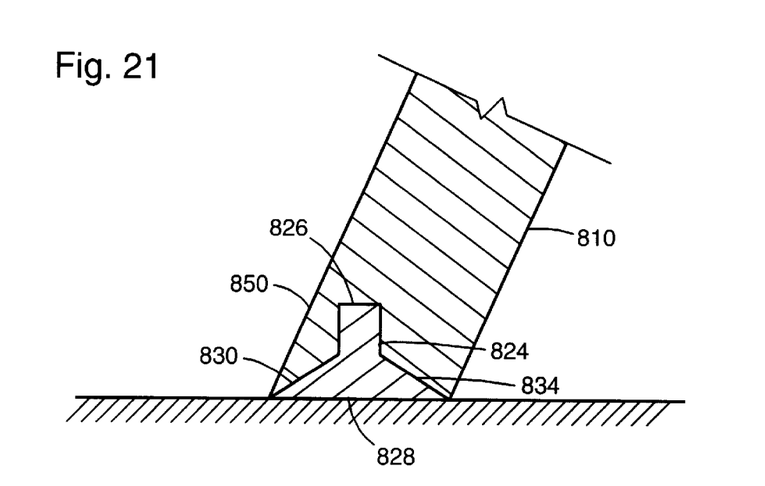
FIG. 21 is a cross sectional view of yet another embodiment of a channel and insert according to the invention.

FIG. 21 shows another embodiment of the board 810 and insert 824 according to the invention. In this embodiment, the neck portion 826 does not extend parallel with the board 810. Instead the neck portion 826 is at an angle to the board 810. This insert 824 includes a pavement contacting portion 828 having distally opposite side walls 830 and 834 which taper outwardly from the neck portion 826. However, in this embodiment, it is preferable to shape the insert 824 symmetrically such that the side walls 830 and 832 are the about same size and taper from the neck portion 826 at the about same angle. This embodiment is less preferred as it may tend to weaken the board 810 at the place where the insert 824 nears the edge of the board 810, as shown as 850.

The variety of modifications shown in the alternative embodiments are independent from each other. Thus, a variety of them may be selected together and it is intended that any combination of the above possible modifications be considered to come within the scope of the claims.

While certain preferred embodiments of the present invention have been disclosed in detail, it is to be understood that various modifications may be adopted without departing from the spirit of the invention or scope of the following claims.

We claim:

1. An insert mountable in a receiving opening formed longitudinally along a vehicle-mounted, material-moving board, comprising:
 a neck portion configured for fixed insertion in said receiving opening; and
 a pavement-contacting portion extending from said neck portion and having side walls which terminate at a bottom pavement-contacting surface, at least a first one of said side walls being tapered outwardly from said neck portion, said first one of said side walls and a second one of said side walls in spaced opposing relationship to said first one of said side walls diverging in the direction of said bottom pavement-contacting surface.

2. The insert according to claim 1, wherein said board has a width and said pavement-contacting surface extends at least ¾ the width of the board.

3. The insert according to claim 2, wherein said pavement-contacting surface extends the width of the board.

4. The insert according to claim 1, wherein said insert has a length of about 1 inch.

5. The insert according to claim 1, wherein one edge of said board meets said pavement-contacting surface at an angle of about 65 degrees.

6. The insert according to claim 5, wherein said insert has a length of about 1 inch.

7. The insert according to claim 5, wherein said board has a center line and said insert has a center line, said center line of said insert being offset from said center line of said board.

8. The insert according to claim 5, wherein said neck portion has a width and said board has a width, said width of said neck portion being about one-half said width of said board.

9. The insert according to claim 1, wherein said board has a center line and said insert has a center line, said center line of said insert being offset from said center line of said board.

10. The insert according to claim 1, wherein said neck portion has a width and said board has a width, said width of said neck portion being about one-half said width of said board.

11. The insert according to claim 1, wherein said insert is attached to said board by brazing.

12. The insert according to claim 1, wherein said second one of said side walls tapers outwardly from said neck portion.

13. The insert according to claim 12, wherein said first and second ones of said side walls continuously diverge in the direction of said bottom pavement-contacting surface.

14. The insert according to claim 1, wherein said first and second ones of said side walls continuously diverge in the direction of said bottom pavement-contacting surface.

15. A board including a longitudinally-extending receiving opening which cooperates with an insert, said insert comprising:

a neck portion fixed in said receiving opening; and a pavement-contacting portion extending from said neck portion and having side walls which terminate at a bottom pavement-contacting surface, at least a first one of said side walls being tapered outwardly from said neck portion, said first one of said side walls and a second one of said side walls in spaced opposing relationship to said first one of said side walls diverging in the direction of said bottom pavement-contacting surface.

16. The board according to claim 15, wherein said insert is brazed to said board.

17. The board according to claim 15, wherein said board makes an angle of about 65 degrees with a ground.

18. The insert according to claim 15, wherein said second one of said side walls tapers outwardly from said neck portion.

19. The insert according to claim 13, wherein said first and second ones of said side walls continuously diverge in the direction of said bottom pavement-contacting surface.

20. The insert according to claim 15, wherein said first and second ones of said side walls continuously diverge in the direction of said bottom pavement-contacting surface.

* * * * *

UNITED STATES PATENT AND TRADEMARK OFFICE
CERTIFICATE OF CORRECTION

PATENT NO. : 6,003,617
DATED : Dec. 21, 1999
INVENTOR(S) : McSweeney et al.

It is certified that error appears in the above-indentified patent and that said Letters Patent is hereby corrected as shown below:

Column 8, line 13, delete "13" and insert therefor --18--.

Signed and Sealed this

Fifth Day of December, 2000

Attest:

Q. TODD DICKINSON

Attesting Officer     Director of Patents and Trademarks